(12) United States Patent
Sjöö et al.

(10) Patent No.: US 6,880,437 B2
(45) Date of Patent: Apr. 19, 2005

(54) TOOL FOR OBLIQUE MOUNTING SURFACES BETWEEN HOLDER AND TOOL PART

(75) Inventors: Sture Sjöö, Gävle (SE); Klas Forsström, Gävle (SE)

(73) Assignee: Sandvik AB, Sandviken (SE)

( * ) Notice: Subject to any disclaimer, the term of this patent is extended or adjusted under 35 U.S.C. 154(b) by 167 days.

(21) Appl. No.: 10/220,311

(22) PCT Filed: Feb. 28, 2001

(86) PCT No.: PCT/SE01/00434

§ 371 (c)(1),
(2), (4) Date: Dec. 3, 2002

(87) PCT Pub. No.: WO01/64377

PCT Pub. Date: Sep. 7, 2001

(65) Prior Publication Data

US 2003/0185638 A1 Oct. 2, 2003

(30) Foreign Application Priority Data

Mar. 2, 2000 (SE) .............................................. 0000690

(51) Int. Cl.[7] .............................................. B23B 29/00
(52) U.S. Cl. .......................... 82/158; 82/159; 408/226; 408/239 R; 407/101
(58) Field of Search ................................. 407/101, 102; 82/158, 159, 160; 408/226, 231, 233, 713, 239 R; 409/234

(56) References Cited

U.S. PATENT DOCUMENTS

| | | | | |
|---|---|---|---|---|
| 2,697,611 A | * | 12/1954 | Glasser | ........................ 279/6 |
| 4,039,295 A | * | 8/1977 | Hochmuth | ................... 407/39 |
| 4,101,239 A | * | 7/1978 | Wohlhaupter | ............... 408/182 |
| 4,242,018 A | * | 12/1980 | Schurfeld | ................... 408/182 |
| 4,270,422 A | * | 6/1981 | Andersson | ................... 82/158 |
| 4,632,614 A | | 12/1986 | Rall et al. | |
| 4,655,655 A | * | 4/1987 | Schurfeld | ................... 409/232 |
| 5,555,784 A | | 9/1996 | Muendlein et al. | |
| 5,809,854 A | * | 9/1998 | Thielen et al. | ................ 82/153 |
| 5,873,682 A | * | 2/1999 | Tripsa | ........................ 407/101 |
| 6,146,060 A | * | 11/2000 | Rydberg et al. | .............. 407/40 |
| 6,244,780 B1 | | 6/2001 | Hansson | |
| 6,270,294 B1 | * | 8/2001 | Sjoo et al. | .................. 407/101 |
| 6,599,050 B1 | * | 7/2003 | Sjöö | ........................... 403/97 |
| 6,601,486 B1 | * | 8/2003 | Hansson et al. | ............. 82/161 |
| 6,626,614 B1 | * | 9/2003 | Nakamura | ................... 408/59 |
| 6,716,388 B1 | * | 4/2004 | Bruhn et al. | ................... 419/5 |
| 2003/0129024 A1 | * | 7/2003 | Hansson | ................. 403/374.3 |

FOREIGN PATENT DOCUMENTS

WO   WO 00/53362   9/2000

* cited by examiner

*Primary Examiner*—Erica Cadugan
*Assistant Examiner*—Dana Ross
(74) *Attorney, Agent, or Firm*—Burns, Doane, Swecker & Mathis, L.L.P.

(57) ABSTRACT

A tool for chip removing machining includes a holder and a tool head removably attached to the holder by screws. The head, which carries at least one cutting insert, has a serrated surface mated with a serrated surface of the holder. Those serrated surfaces define an interface between the holder and the head which is oriented at a 45 degree angle with respect to a basal plane extending through the holder and containing a longitudinal axis thereof.

9 Claims, 7 Drawing Sheets

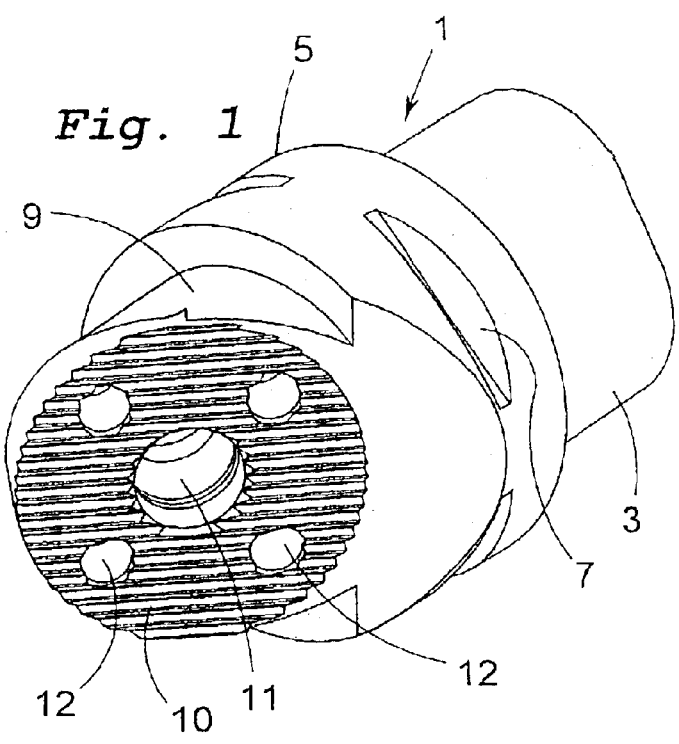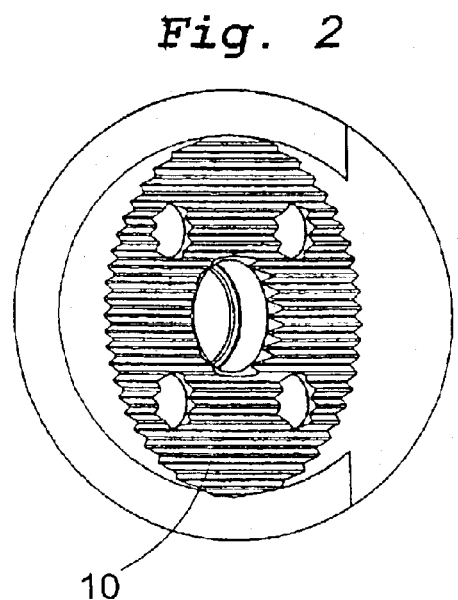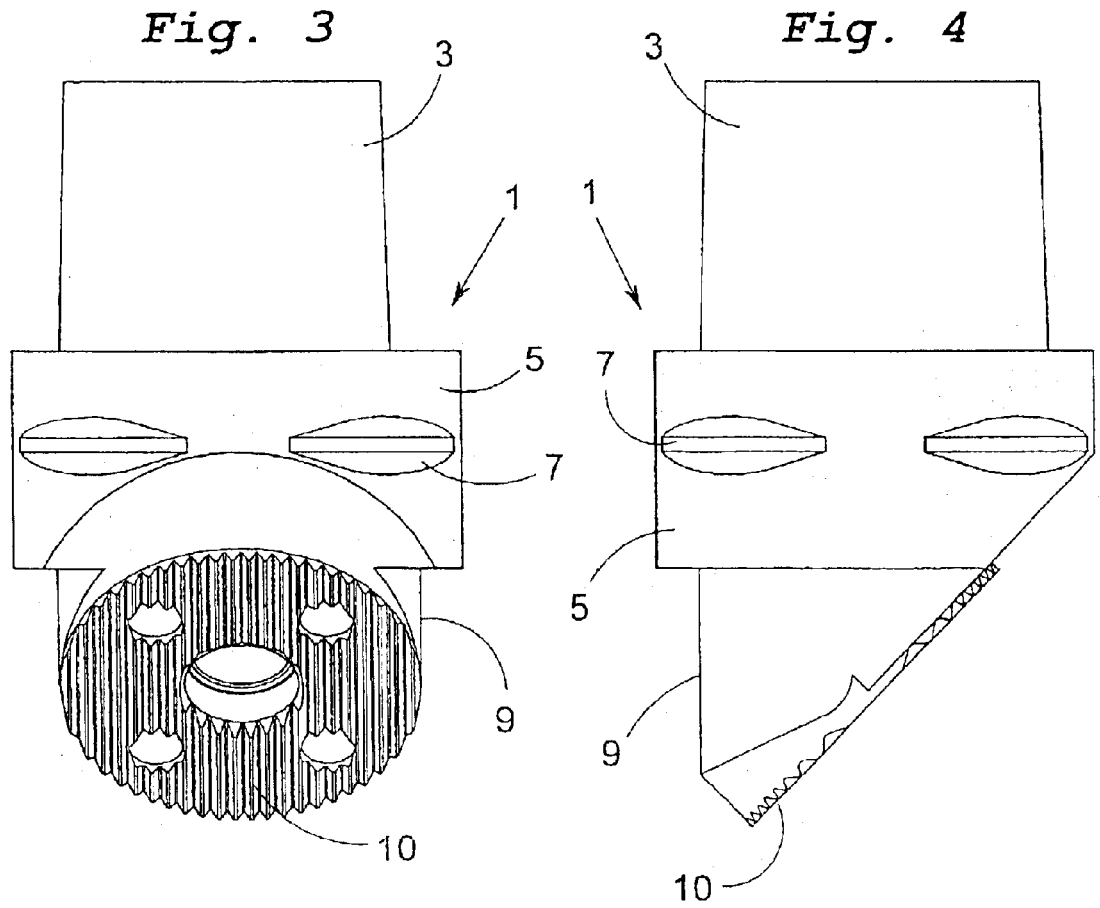

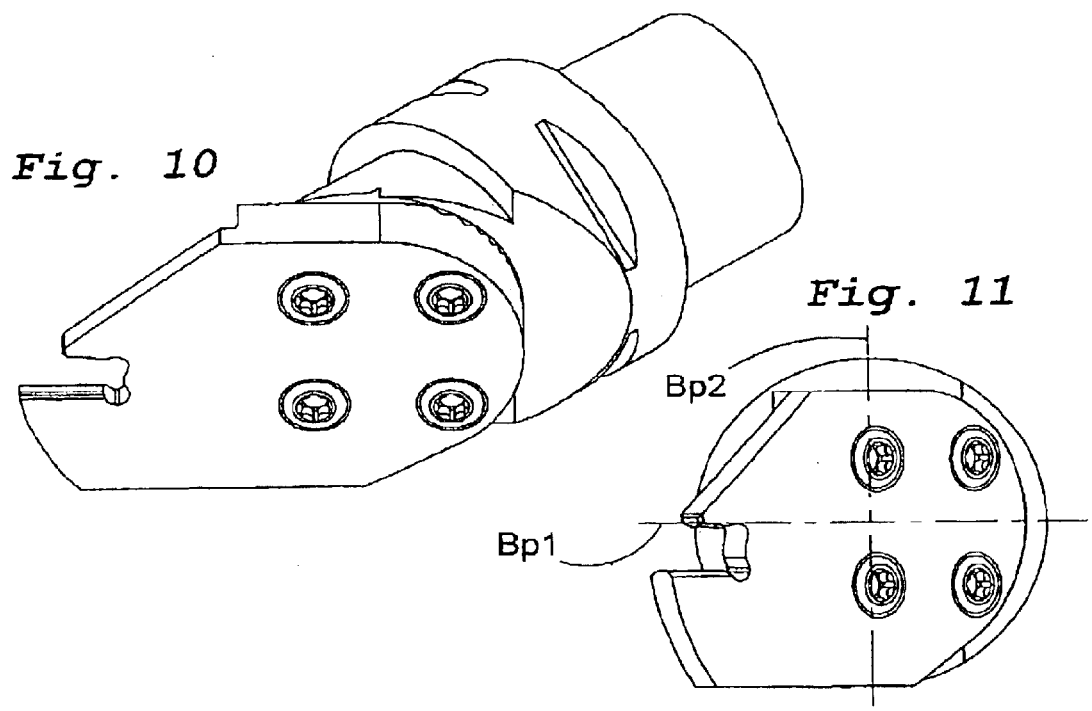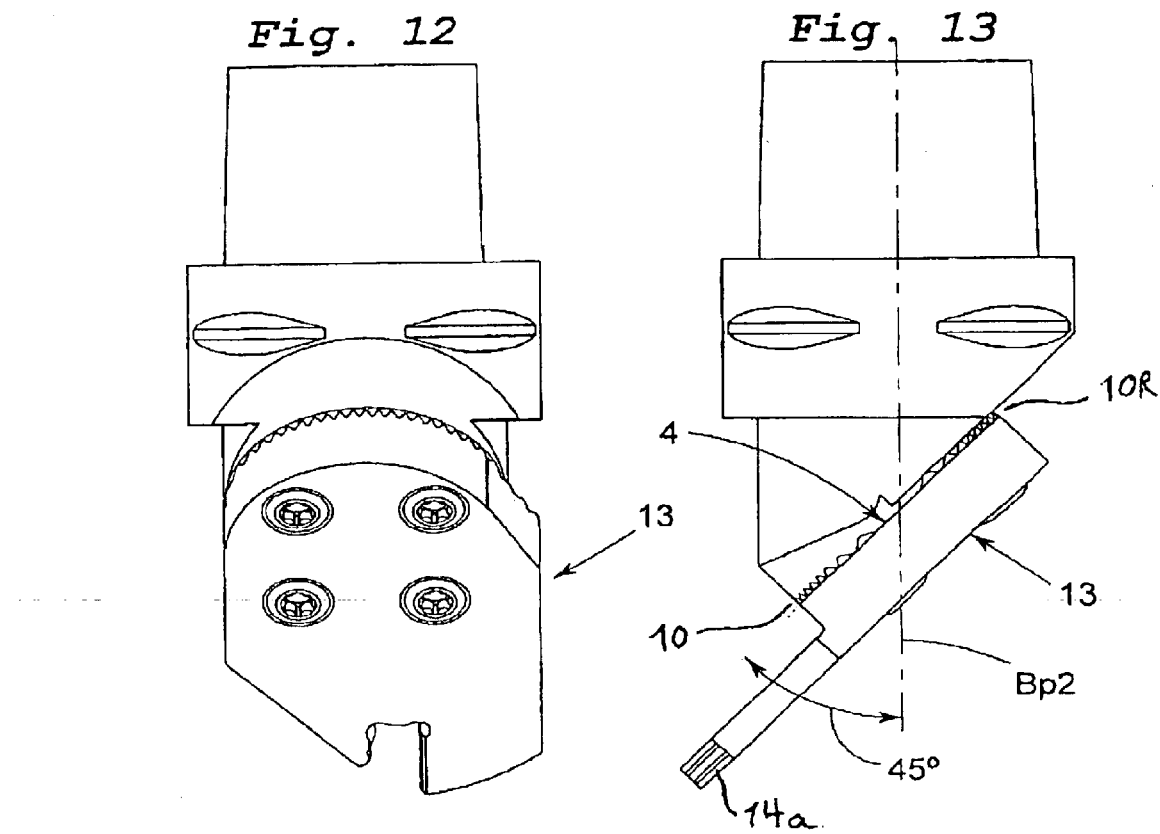

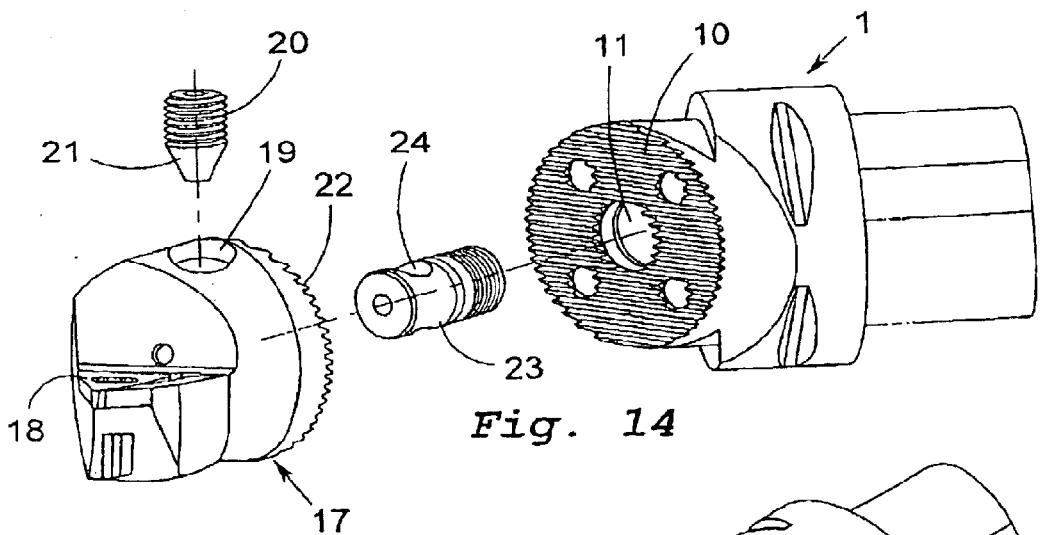
Fig. 14
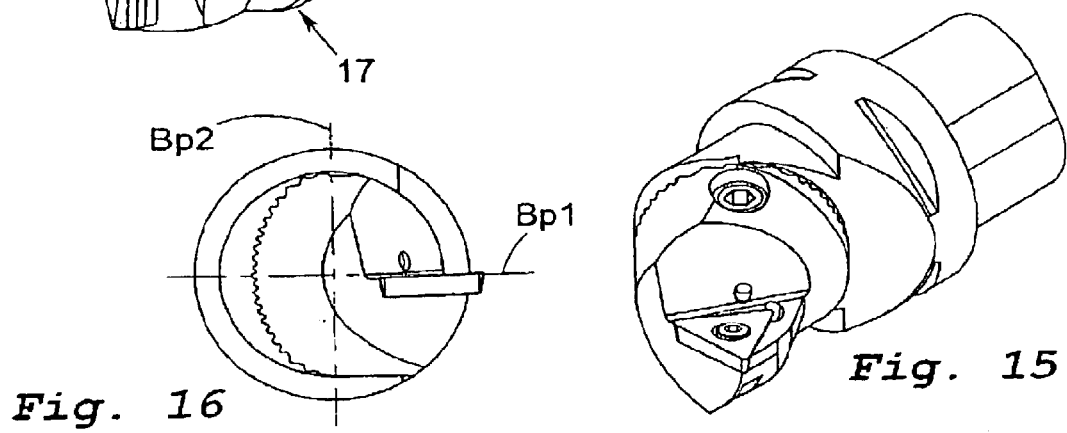
Fig. 16
Fig. 15
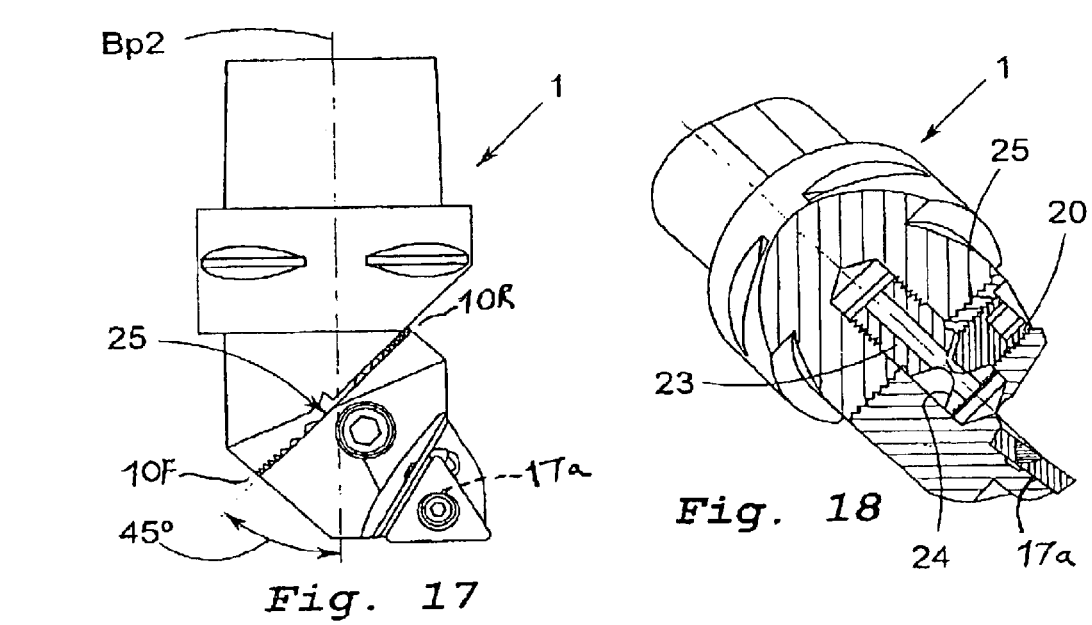
Fig. 17
Fig. 18

TOOL FOR OBLIQUE MOUNTING SURFACES BETWEEN HOLDER AND TOOL PART

TECHNICAL FIELD OF THE INVENTION

The present invention relates to a tool for chip removing machining, which comprises a holder as well as a tool head connected therewith, which carries at least one cutting insert for chip removing machining, the holder and tool head being connected to each other by means of cooperating connecting surfaces with force-transmitting members arranged in connection therewith, and that the tool comprises members for connecting the tool head to the holder. The invention also relates to a tool head and a holder separately.

PRIOR ART

A turning tool is disclosed in WO 93/10929 (corresponding to U.S. Pat. No. 5,555,784), which comprises a cylindrical shaft as well as a head, which is equipped with a cutting insert for chip removing machining. The head and the cylindrical shaft are connected via parallel dividing surfaces, which are serrated and slope in relation to the longitudinal center axis of the tool. In the assembled state of the tool, the parallel dividing surfaces form an interface which, when seen in a side view of the tool, slopes in relation to the longitudinal center axis of the tool. The object of the sloping interface is to ensure that the forces acting on the tool can be absorbed by said interface in art optimal way.

OBJECTS AND FEATURES OF THE INVENTION

A primary object of the present invention is to describe a tool and a tool head of the kind defined in the introduction, through which a relatively small number of units, i.e. holders and tool heads, respectively, result in a large number of possible combinations for the assembled tool according to the present invention, for instance as regards the type of machining as well as direction of feeds.

Yet another object of the present invention is that the connection of the holder and tool head should be user-friendly as well as ensuring that the forces acting during the chip removing machining are taken care of in a satisfactory way.

Another object of the present invention is to enable the exchange of only a part of the tool in case damage occurs to the tool head.

DESCRIPTION OF THE DRAWINGS

Below, preferred embodiments of invention will be described, reference being made to the accompanying drawings, where:

FIG. 1 shows a perspective view of a first holder according to the present invention orientated to the right;

FIG. 2 shows a front view of the holder according to FIG. 1;

FIG. 3 shows a side view of the holder according to FIG. 1;

FIG. 4 shows a planar view of the holder according to FIG. 1;

FIG. 10 shows a perspective view of a first tool according to the present invention;

FIG. 11 shows a front view of the tool according to FIG. 10:

FIG. 12 shows a side view of the tool according to FIG. 10:

FIG. 13 shows a planar view of the tool according to FIG. 10;

FIG. 14 shows an exploded view in perspective of a second tool according to the present invention;

FIG. 15 shows a perspective view of the second tool in the assembled state;

FIG. 16 shows a front view of the tool according to FIG. 15;

FIG. 17 shows a planar view of the tool according to FIG. 15;

FIG. 18 shows a partly sectioned perspective view of the tool according to FIG. 15:

DETAILED DESCRIPTION OF PREFERRED EMBODIMENTS OF THE INVENTION

Figure 5:
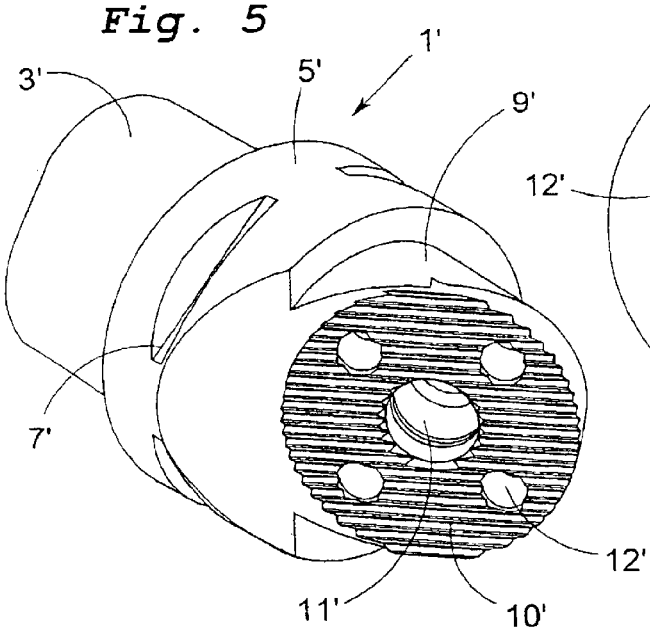
FIG. 5 shows a perspective view of a holder according to the present invention orientated to the left.
Figure 6:
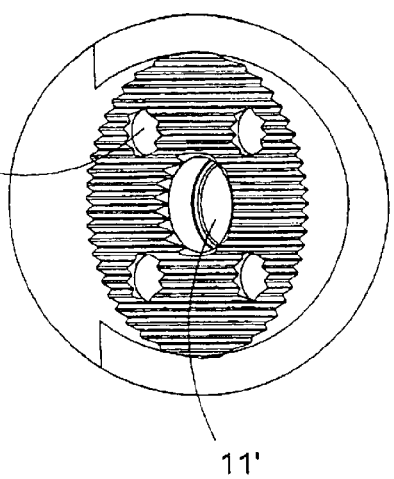
FIG. 6 shows a front view of the holder according to FIG. 5.
Figure 7:
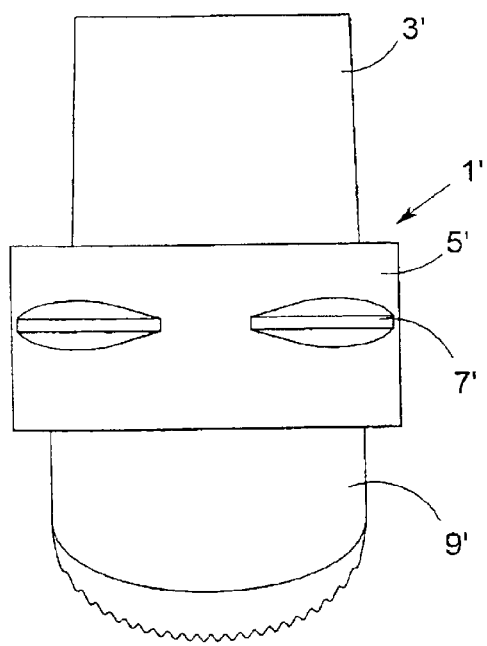
FIG. 7 shows a side view of the holder according to FIG. 5.
Figure 8:
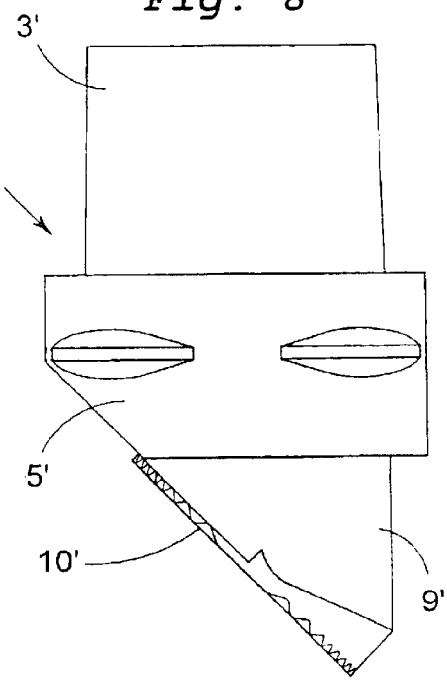
FIG. 8 shows a planar view of the holder according to FIG. 5.

The first holder 1 shown in FIGS. 1–4 is intended to be included in a tool orientated to the right and has at one end thereof a coupling part 3, which in the embodiment illustrated consists of a conical polygon included in a tool system that is marketed under the trade name COROMANT CAPTO®. Said coupling part 3 is intended to be received in a clamping unit, which is also included in the tool system COROMANT CAPTO®.

The first holder 1 has also an intermediate part 5, having grooves/recesses 7 for gripping devices that should handle the first holder 1 during tool changing. The first holder 1 also has a connecting part 9 turned away from the coupling part 3, which defines a longitudinal axis (see FIG. 11) is intended to be connected to a tool head carrying at least one cutting insert for chip removing machining. This will be described in more detail below.

The free end of the connecting part 9 consists of a first connecting surface 10, which is serrated and has an orientation which is defined below, see especially FIGS. 13 and 17. The grooves of the serrated surface run parallel to the plane of the paper in FIG. 4. As is seen in FIGS. 1–4, the serrated surface 10 is provided with a first center hole 11, which is internally threaded, as well as four second holes 12, which in the embodiment illustrated are arranged symmetrically around the center hole 11. The function of said holes 11 and 12 will be evident from the description below.

The second holder 1' according to the present invention shown in FIGS. 5–8 is mirror-inverted in relation to the first holder 1 according to FIGS. 1–4. In other respects, the second holder 1' and the first holder 1 are identically formed. The first holder 1' is intended to be included in a tool orientated to the right. The reference designations for the details of the second holder 1' have the same numbers as the reference designations for the first holder 1, but the reference designations for the details of the second holder 1' are provided with a prime sign(').

Figure 9:
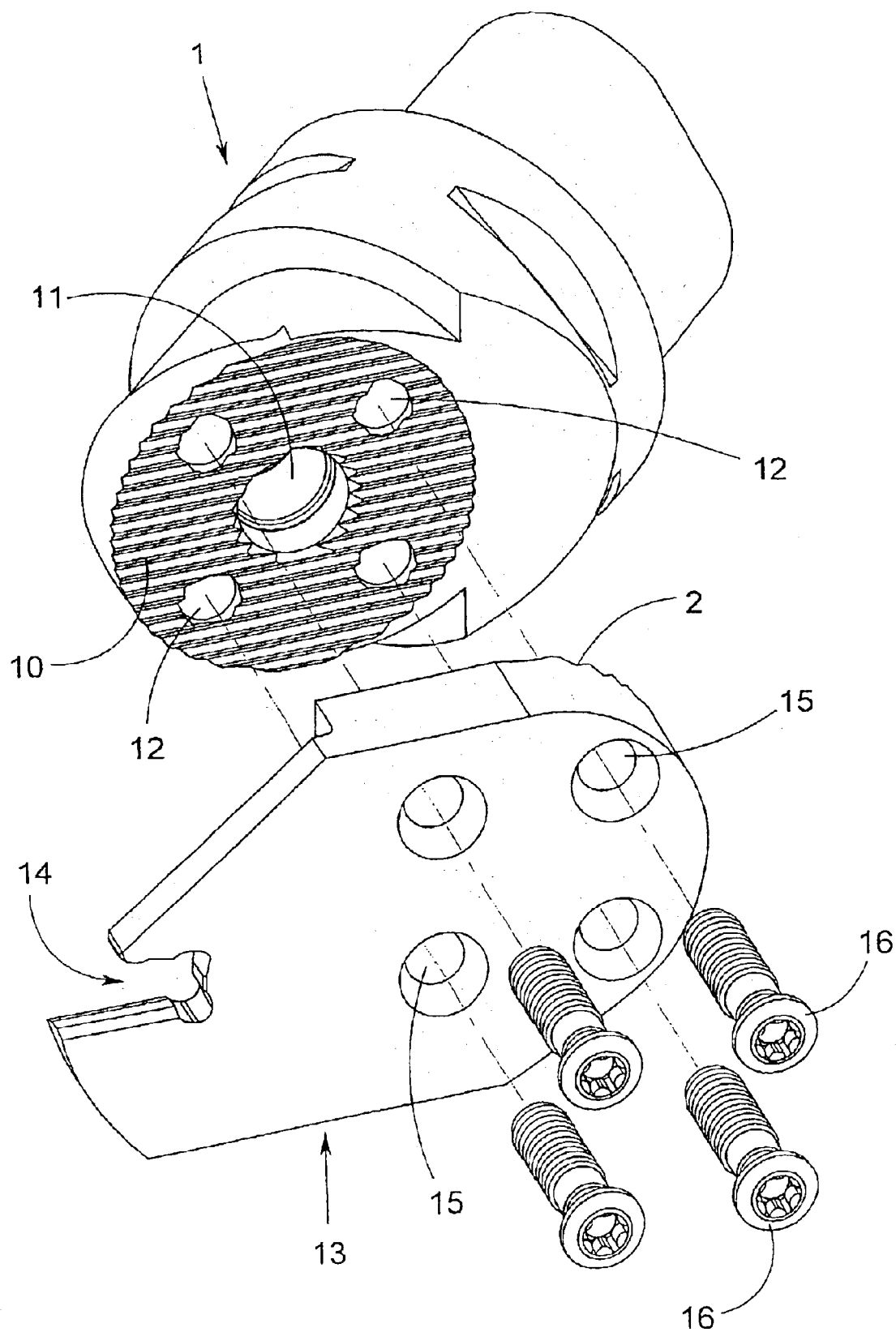
FIG. 9 shows an exploded view in perspective of a second holder orientated to the right, a first tool head for a slotting tool as well as fastening members in the form of screws.

As is seen in FIG. 9, a first tool head 13 may be mounted on the first holder 1, which head has a cutting seat 14 for a cutting insert (not shown), preferably a slotting tool. The cutting seat 14 includes a seating surface 14a on which the cutting insert is to be seated. The first tool head 13 has furthermore four third holes 15, which are positioned in such a way that when the first tool head 13 is correctly mounted on the end surface 10, the third holes 15 will be situated just in front of the internally threaded second holes 12. A second connecting surface 2 of the first tool head 13 turned against the first holder 1 is serrated (said surface 2 is not seen in FIG. 9), the serrated surfaces 102 of the holder and the tool head being formed in such a way that they fit against each other when the first tool head 13 is connected with the first holder 1.

In order to connect the first tool head 13 with the first holder 1, four first screws 16 are applied in the through-holes 15, said first screws 16 being anchored in the internally threaded second holes 12. Thereby, the first tool head 13 is, via the cooperating serrations, connected to the first holder 1 in a satisfactory way, i.e, the joint between the first tool head 13 and the first holder 1 resists the stresses which said connection is subjected to.

In FIGS. 10–13, a first tool according to the present invention is shown, which is provided when the first tool head 13 is connected with the first holder 1. In doing so, the serrated surface 10 of the holder 1 will come into abutment against the serrated surface 2 of the tool head 13, said surfaces 2, 10 forming a dividing plane 4. In FIG. 11, a first basal plane Bp1 and a second basal plane Bp2 of the tool are shown, said basal planes forming a right angle to each other, and extending longitudinally relative to the coupling part. The closer definition, primarily of the second basal plane Bp2, will be given below in connection with FIG. 19 being described.

Said basal planes Bp1 and Bp2 have an extension that is perpendicular to the paper in FIG. 11. In FIG. 13, only the second basal plane Bp2 is seen, which has an extension perpendicular to the paper in FIG. 13. As is seen in FIG. 13, the second basal plane Bp2 of the first tool intersects the connecting surface 2 of the holder at an intermediate location substantially midway between axially foremost and axially rearmost ends 10F, 10R of that surface. The basal plane Bp2 forms an angle of 45° to the serrated surfaces 2, 10 of the first tool head 13 and the holder 1 when viewing the tool head in a direction perpendicular to a plane of the insert seating surface 14a. This may also be expressed as the second basal plane Bp2 forming an angle of 45° to the dividing plane 4. The basal plane BP2 intersects the individual serrations transversely thereof.

How a second tool head 17, which carries a trigonometric cutting insert 18 is connected to a first holder 1 is shown in FIGS. 14–18. Thereby a second tool according to the present invention is formed. The second tool head 17 also has a through, internally threaded) fourth hole 19, which is intended to receive a second screw 20, which is provided with a conical end 21. Furthermore, said second tool head 17 has an inclined serrated surface 22 (not visible in FIG. 14) which, when viewing the tool head 17 in a direction perpendicularly to a plane of the seating surface 17a, forms an angle of 45° to a second basal plane Bp2 of the second too, see FIG. 17, when the second tool head 17 is connected to the first holder 1. In the position shown in FIG. 14 of the first holder 1 and the second tool head 17, the serrations in the serrated surfaces 10 and 22 run parallel to each other.

As can be seen in the exploded view, a Center plug 23, which has an externally threaded end, is intended to be screwed into the first center hole 11, see also FIG. 18 which shows the center plug 23 applied in the first holder 1. The center plug 23 has two diametrically opposite conical countersinks 24, one of which, see FIG. 18, houses the conical end 21 of the second screw 20 when the second tool head 17 is connected to the first holder 1. As a preparation for connecting the second tool head 17 to the first holder 1, the center plug 23 has been screwed in the internally threaded hole 11, in doing which attention should be paid to the opposite conical countersinks 24 being oriented in such a way that a longitudinal center line through said countersinks extends perpendicularly to the direction in which the serrations of the end surface 10 run. At the actual joining of the second tool head 17 with the first holder 1, said second tool head 17 is inserted over the protruding part of the center plug 23. When the serrated surfaces 10 and 22 have come into engagement with each other, the second screw 20 is threaded into the hole 19 until the conical part 21 of the screw 20, has come into engagement with one of the countersinks 24 of the center plug 23, see FIG. 18. in that connection, as is seen in FIG. 18, the conical part 21 of the second screw 20 comes into contact with one side of the conical countersink 24, which means that the serrated surface 22 of the second tool head 17 is pressed into abutment against the serrated surface 10 of the first holder 1, a dividing plane 25 being formed, see FIGS. 17 and 18 of the second tool according to the present invention. Thereby, the second tool head 17 is connected, in a satisfactory manner, to the first holder 1, i.e., said connection resists the forces which act when the chip removing machining operation is to be carried out with the second tool according to the present invention. In FIGS. 15–18, the second tool is shown in the mounted state; in FIG. 16 a first basal plane Bp1 and a second basal plane Bp2 being introduced, which have an extension perpendicular to the paper in FIG. 16. The second basal plane Bp2 is also introduced in FIG. 17, said second basal plane Bp2 having an extension perpendicular to the paper in FIG. 17. As is seen in FIG. 17, the second basal plane Bp2 forms an angle of 45° to the dividing plane 25 of the second tool according to the present invention.

Figure 19:
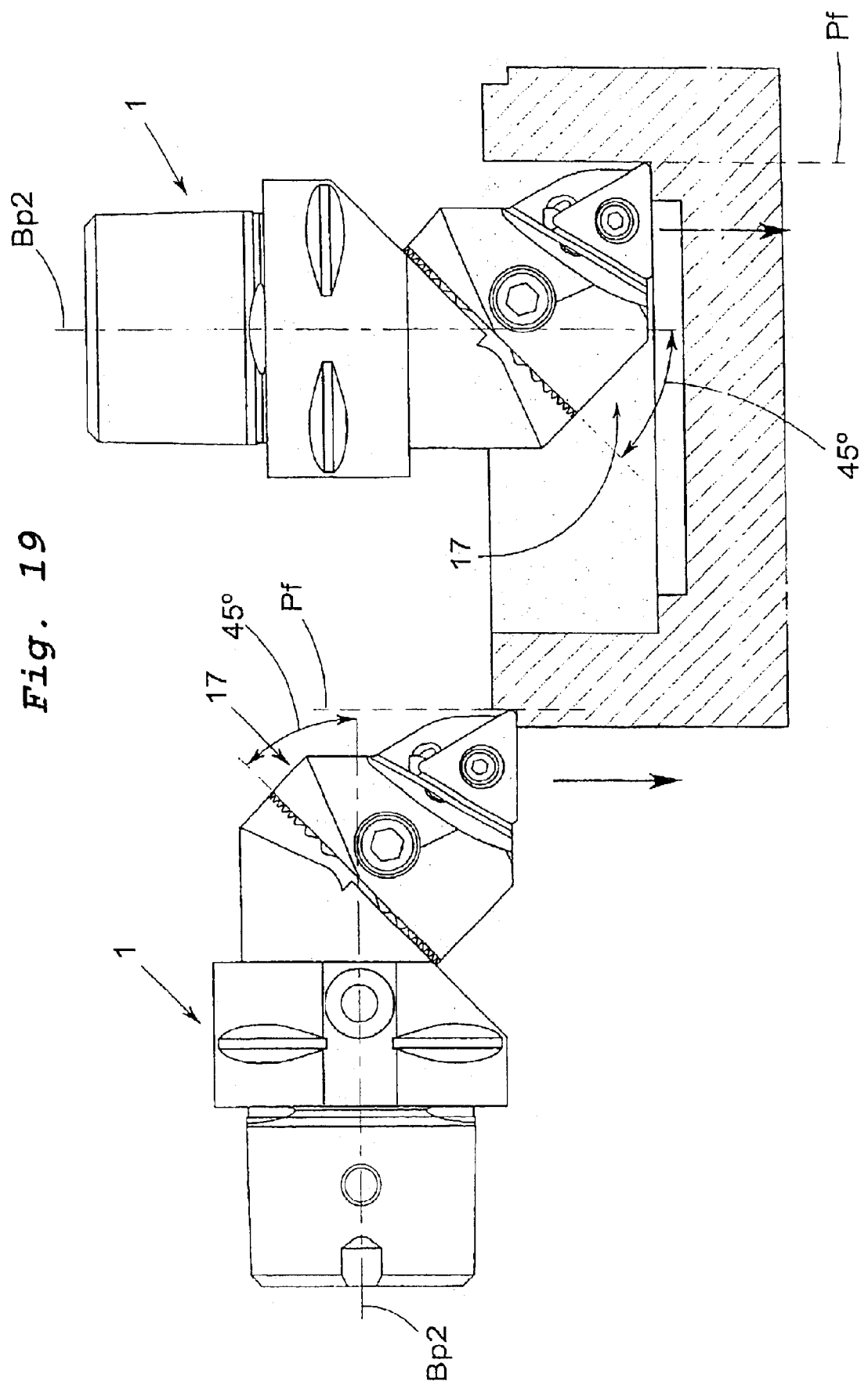
FIG. 19 shows how two tools according to the present invention perform machining of a workpiece.

In FIG. 19, the tool according to FIG. 17 is shown in two different embodiments, whereby said tool may perform different types of machining in the two embodiments. In the embodiment to the right in FIG. 19, an end cutting tool is shown, $P_f$ representing a plane of the feed, which is defined in ISO 3002/1-1982 (E). In end cutting tools, the second basal plane Bp2 is parallel to the plane of the feed $P_f$. The arrow designated f shows the appurtenant direction of feed of the tool according to the embodiment to the right in FIG. 19.

In the embodiment to the left in FIG. 19, the holder 1 has been rotated 180° around the longitudinal center axis thereof while the tool head 17 has been maintained in the same position as in the embodiment to the right in FIG. 19. At this rotation of the holder 1, the longitudinal center axis thereof will be turned 90°, which is realized by regarding the two embodiments in FIG. 19.

The embodiment of the tool to the left in FIG. 19 represents a side-cutting tool, the appurtenant plane of the feed $P_f$ of said left embodiment having been drawn in. The arrow-designated f shows the appurtenant direction of feed of the tool according to the embodiment to the left in FIG. 19. Thus, in side cutting tools, the second basal plane Bp2 is perpendicular to the plane of the feed $P_f$. In both the embodiments shown in FIG. 19, generally applies that the dividing plane 25 forms an angle of 45° to the second basal plane Bp2.

Figure 20:
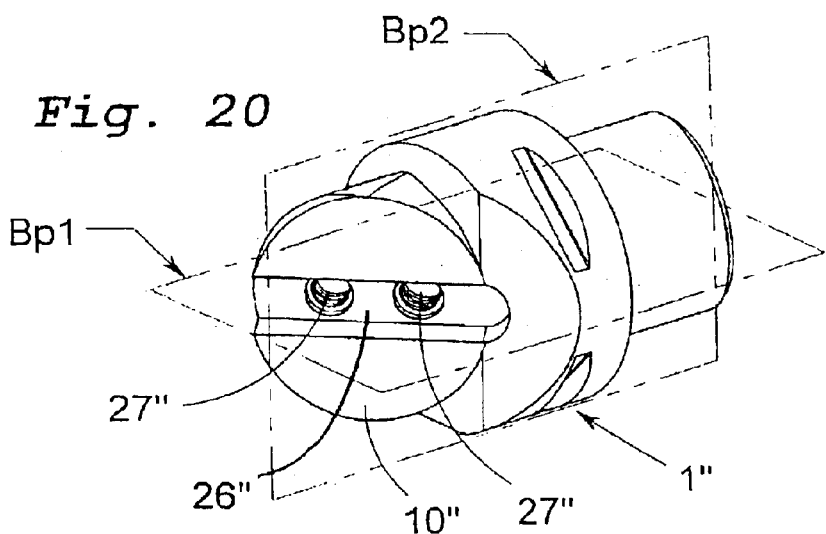
FIG. 20 shows a perspective view of an alternative embodiment of a holder according to the present invention.
Figure 21:
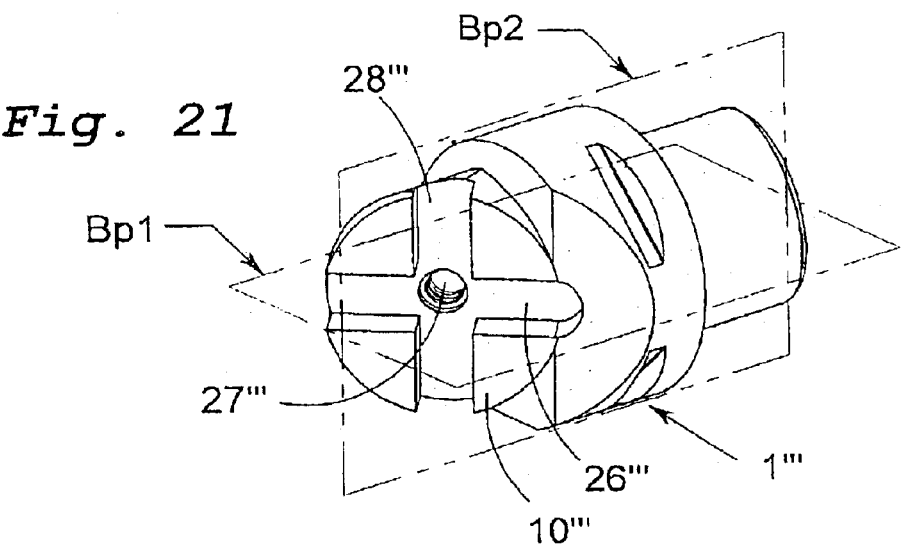
FIG. 21 shows a perspective view of another alternative embodiment of a holder according to the present invention.
Figure 22:
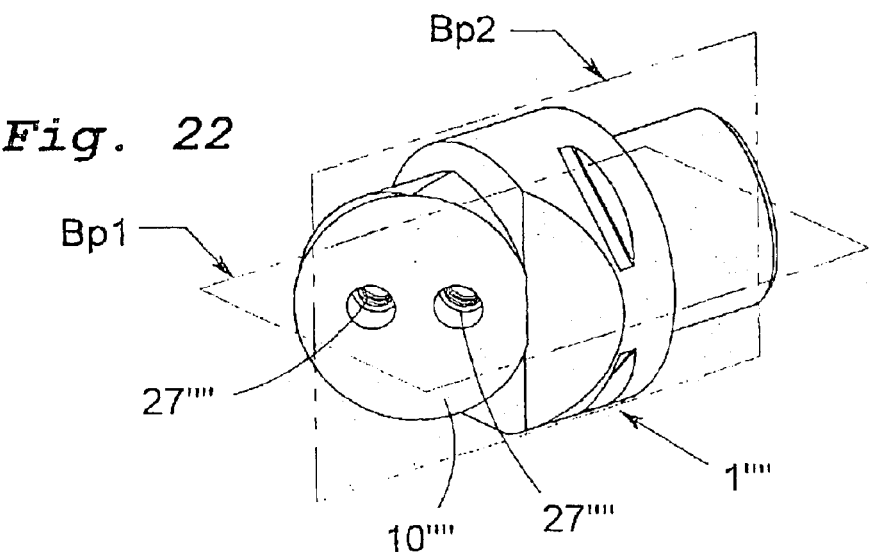
FIG. 22 shows a perspective view of yet another alternative embodiment of a holder according to the present invention.

In FIGS. 20–22 three alternative embodiments of the first connecting surface of a dividing plane between the holder and the tool head are shown. Thus, FIG. 20 shows a holder 1" having a first connecting surface 10", which is provided with a transverse wedge-shaped groove 26", which has an extension parallel to a first basal plane Bp1, which is drawn in FIG. 20. In the bottom of the wedge-shaped groove 26", two internally threaded holes 27" are arranged, which are intended to receive screws of a wedge arranged on a tool head, which wedge is intended to be received in said wedge-shaped groove 26". By anchoring the screws in the holes 27", a connection is provided between the holder 1" and the appurtenant tool head, not shown, which manages to transfer the stresses with normally occur. In FIG. 20, a second basal plane Bp2 is also drawn in, the first connecting surface 10" and the dividing plane in which said first connecting surface 10" is included forming an angle of 45° to the second basal plane Bp2, in a similar way to that the above described embodiments.

The alternative embodiment of a holder 1''' according to the present invention shown in FIG. 21 differ principally from the holder 1" according to FIG. 20 in that a first connecting surface 10" has two wedge-shaped grooves 26''' and 28''', which form a cross. Furthermore, only one internally threaded hole 27''' is arranged in the first connecting surface 10''' where the wedge-shaped grooves 26''' and 28''' intersect. The appurtenant tool head not shown, is provided with two wedges which intersect and which are intended to be received in the wedge-shaped grooves 26''' and 28''' in connection with the appurtenant tool head being connected with the holder 1'''. Furthermore, the appurtenant tool head is provided with a center screw, which is intended to be received in the hole 27''' in connection with the appurtenant tool head being connected with the holder 1'''. In FIG. 21, a first basal plane Bp1 and a second basal plane Bp2 are drawn in, which form a right angle to each other. The wedge-shaped groove 26''' is parallel to the first basal plane Bp1 and the wedge-shaped groove 28''' is parallel to the second basal plane Bp2. The first connecting surface 10''' and the dividing plane in which said first connecting surface 10''' is included form an angle of 45° to the second basal plane Bp2 in a similar way to that in the above described embodiments.

The alternative embodiment of a holder 1" " according to the present invention shown in FIG. 22 has a first connecting surface 10''' which in principle is smooth, i.e., it does not have any engagement members which are intended to cooperate with the corresponding connecting surface on the tool head which is now shown, the last-mentioned connecting surface preferably also being in principle smooth. The necessary force transmitting engagement between the holder 1"" and the tool head (not shown), takes place by the first connecting surface 10"" being provided with two internally threaded holes 27"", in which screws of the not shown appurtenant tool head are intended to be received. Thus, it is said screws which provide the necessary transmission of force between the holder 1''' and the not shown tool head, i.e., in this case, the force-transmitting members between the holder and the tool head are identical with the members for connecting the holder and the tool head with each other. In FIG. 22, a first basal plane Bp1 and a second basal plane Bp2 are drawn in, which form a right angle to each other. The first connecting surface 10"" and the dividing plane in which said first connecting surface 10"" is included form an angle of 45° to the second basal plane Bp2 in correspondence with the above described embodiments.

Feasible Modifications of the Invention

The tool head according to the present invention may, on one hand be formed in a plurality of different ways and on the other hand different types of cutting inserts may be attached to the tool head. Thus, the embodiments described above constitute only examples within the scope of the invention.

As for the design of the coupling part of the holder, this may also be formed in a plurality of different ways as a number of tool systems having differing principles for connecting the holder with a clamping unit are always found on the market.

Irrespective of the type of tool head and coupling part, all tools of the kind in question have in principle a second basal plane Bp2, according to the definition given above in connection with FIG. 19, where the relation between the plane of the feed $P_f$ defined according to ISO-standard the and the second basal plane Bp2 is given, of course considering whether an end cutting or a side cutting tool is concerned.

As for the different members shown above for connecting holder and tool head with each other, these only constitute examples within the scope of invention. Correspondingly, the designs shown above of the cooperating surfaces in the dividing plane between the holder and tool head only constitute examples within the scope of the present invention. In that context, it should, however, be pointed out that serrated surfaces constitute the primary embodiment.

What is claimed is:

1. A tool for chip removing machining, comprising a holder and a tool head connected therewith, the holder defining a central longitudinal axis, the tool head including an insert-receiving seating surface on which a cutting insert is to be seated, the holder and the tool head including mutually facing connecting surfaces engaging one another to define a dividing plane therebetween, connecting members provided for rigidly connecting the tool head with the holder, the dividing plane extending in a direction generally perpendicular to a plane of the seating surface and forming a substantially 45° angle with a basal plane of the holder that extends in a direction generally perpendicular to the plane of the seating surface and that contains the longitudinal axis of the holder and intersects the connecting surface of the holder at an intermediate location substantially midway between axially foremost and rearmost ends of such connecting surface as seen when viewing the tool head in a direction perpendicular to a plane of the seating surface, wherein the basal plane forms an angle of substantially 45° with the dividing plane.

2. The tool according to claim 1 wherein the connecting surface of the holder is serrated and contains a threaded center hole and a plurality of threaded secondary holes arranged generally symmetrically around the center hole.

3. The tool according to claim 2 wherein the connecting surface of the tool head is serrated and meshes with the serrated surface of the connecting surface of the holder, the connecting surface of the tool head including a center hole and a plurality of secondary holes aligned with the center hole and secondary holes, respectively, of the holder.

4. The tool according to claim 3 wherein the connecting members comprise a center plug disposed in the aligned center holes of the holder and the tool head, the tool head including a locking member engageable with the plug to force the connecting surfaces toward one another.

5. The tool according to claim 3 wherein the connecting members comprise screws receivable in respective ones of the secondary holes of the holder.

6. The tool according to claim 3, wherein the serrations of the serrated connecting surfaces are defined by mutually parallel channels.

7. The tool according to claim 1 wherein, each of the connecting surfaces of the holder and the tool head includes serrations, and the basal plane intersects the serrations transversely thereto.

8. A holder defining a longitudinal axis and comprising a coupling part at a first longitudinal end of the holder and a connecting part disposed at a second longitudinal end thereof, the connecting part including a connecting surface facing away from the first longitudinal end and forming a substantially 45° angle relative to a basal plane that contains the longitudinal axis of the holder and intersects the connecting surface of the holder at an intermediate location substantially midway between axially foremost and rearmost ends of the connecting surface, the basal plane forming with the connecting surface an angle of substantially 45 degrees, wherein the connecting surface includes parallel serrations formed therein, each serration having opposing ends extending to an outer periphery of the connecting surface, one of the ends of each serration disposed axially forwardly with respect to the other end, wherein the basal plane passes substantially midway between the opposite ends of each such serration.

9. The holder according to claim 8, wherein at least one threaded hole is formed in the connecting surface.

* * * * *